(12) United States Patent
Van Mil et al.

(10) Patent No.: US 9,689,480 B2
(45) Date of Patent: Jun. 27, 2017

(54) LINEAR ACTUATOR

(71) Applicant: Robert Bosch GmbH, Stuttgart (DE)

(72) Inventors: Roel Van Mil, Boxtel (NL); Evert Mulder, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/951,300

(22) Filed: Nov. 24, 2015

(65) Prior Publication Data

US 2016/0153476 A1    Jun. 2, 2016

(30) Foreign Application Priority Data

Nov. 27, 2014 (DE) .................. 10 2014 224 257

(51) Int. Cl.
| | |
|---|---|
| *F01B 9/00* | (2006.01) |
| *F16H 25/20* | (2006.01) |
| *F15B 15/08* | (2006.01) |
| *F16F 9/06* | (2006.01) |
| *G09B 9/14* | (2006.01) |
| *F15B 15/20* | (2006.01) |
| *F15B 15/14* | (2006.01) |

(52) U.S. Cl.
CPC ............ *F16H 25/20* (2013.01); *F15B 15/08* (2013.01); *F16F 9/06* (2013.01); *G09B 9/14* (2013.01); *F15B 2015/1495* (2013.01); *F15B 2015/206* (2013.01)

(58) Field of Classification Search
CPC ............ F15B 15/088; F15B 2015/1419; F15B 2015/206
See application file for complete search history.

(56) References Cited

U.S. PATENT DOCUMENTS

| | | | |
|---|---|---|---|
| 5,944,376 A | 8/1999 | Buchanan, Jr. | |
| 7,397,209 B2 * | 7/2008 | Hirai | ..................... F15B 15/088 |
| | | | 310/112 |

FOREIGN PATENT DOCUMENTS

| | | |
|---|---|---|
| DE | 11 2005 002 952 T5 | 9/2007 |
| DE | 10 2009 007 958 A1 | 10/2010 |
| DE | 10 2009 007 952 B4 | 4/2012 |

* cited by examiner

*Primary Examiner* — Michael Leslie
(74) *Attorney, Agent, or Firm* — Maginot, Moore & Beck LLP

(57) ABSTRACT

A linear actuator for moving a load includes a tubular actuator housing, which has an end-side housing bottom and an end-side housing head, a rotatably drivable threaded spindle which is mounted rotatably in the housing bottom of the actuator housing and extends in an interior of the actuator housing from the housing bottom in a direction of the housing head, a piston which comprises a spindle nut, which is in engagement with the threaded spindle, and is guided longitudinally in the actuator housing, and a hollow actuator rod which is assembled with the piston, into which actuator rod the threaded spindle dips, and which actuator rod protrudes out of the actuator housing on the housing head. The linear actuator is configured such that the actuator housing is filled with pressurized oil and gas, the oil and gas being situated in a single volume.

10 Claims, 3 Drawing Sheets

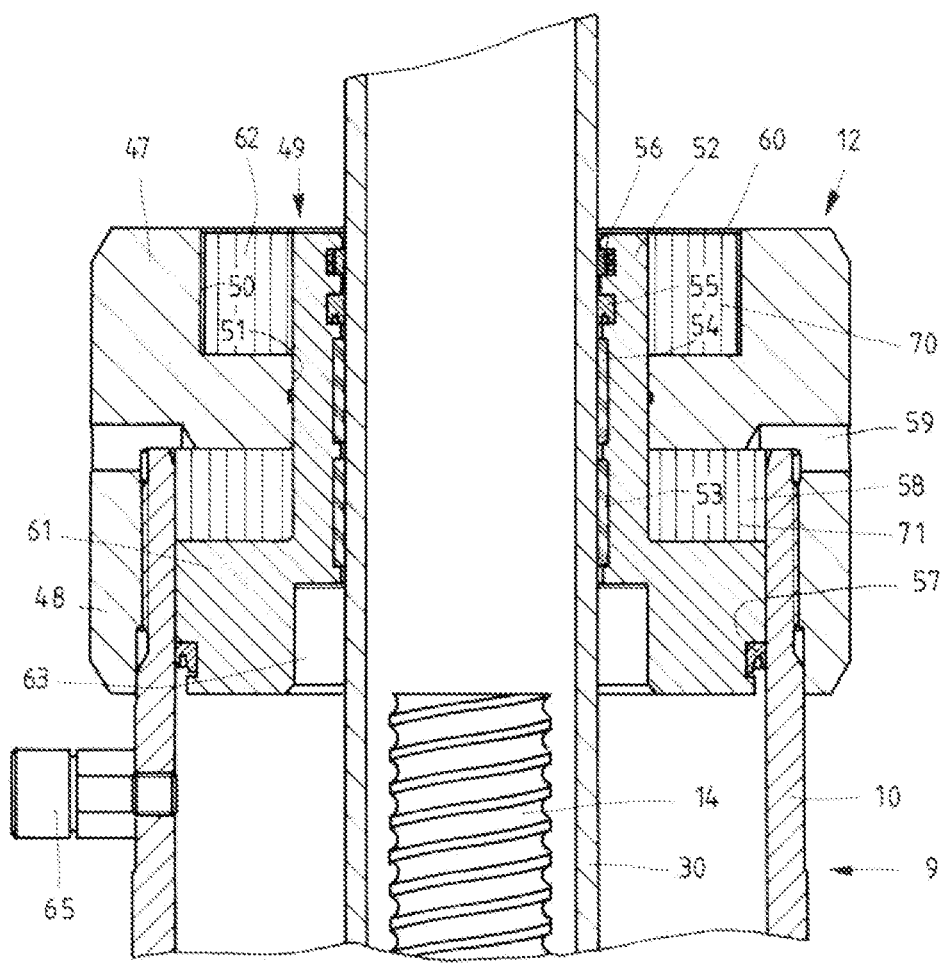

LINEAR ACTUATOR

This application claims priority under 35 U.S.C. §119 to patent application no. DE 10 2014 224 257.6, filed on Nov. 27, 2014 in Germany, the disclosure of which is incorporated herein by reference in its entirety.

BACKGROUND

The disclosure relates to a linear actuator which serves to move a load. One preferred field of use is movement systems such as driving simulators and flight simulators, in which a cab is mounted on a platform which can be moved in six degrees of freedom by a total of six identical linear actuators. Linear actuators are known which have a tubular actuator housing which has an end-side housing bottom and an end-side housing head, a rotatably drivable threaded spindle which is mounted rotatably in the housing bottom of the actuator housing and extends in the interior of the actuator housing from the housing bottom in the direction of the housing head, a piston which comprises a spindle nut, which is in engagement with the threaded spindle, and is guided longitudinally in the actuator housing, and a hollow actuator rod which is assembled with the spindle nut, into which actuator rod the threaded spindle dips, and which actuator rod protrudes out of the actuator housing on the housing head.

It is also known to equip a linear actuator of this type with means for compensating for the static load, up to 75% of the static load being supported, for example, by way of said means. The remaining proportion of the load is absorbed by the threaded spindle. If a plurality of linear actuators are provided to carry the load, each linear actuator of course accepts only a certain proportion of the load. If desired, up to 100% of the static load can also be compensated for.

In a known linear actuator of the type depicted, the means for at least partial compensation of the load operate like a pneumatic spring. The tubular actuator housing is surrounded by a further tube, with the result that an annular space is configured which is divided by way of a piston into a gas space and into an oil space which is connected fluidically to the interior of the actuator housing. The entire interior space of the actuator housing and the interior of the hollow actuator rod which is connected fluidically to the interior space of the actuator housing by way of small radial bores close to the piston are filled with oil. The piston has ducts, via which the part volumes on both sides of the piston are connected fluidically to one another, with the result that oil can be exchanged between the part volumes.

In the known linear actuator, the means for compensating for the load therefore correspond to a hydropneumatic piston accumulator which is assembled in a highly integrated manner with the actual linear actuator.

SUMMARY

The disclosure is based on the object of configuring a linear actuator in such a way that compensation for a static load is obtained in a very simple and inexpensive way.

In a linear actuator as disclosed herein, this object is achieved by virtue of the fact that the actuator housing is filled with pressurized oil and gas, oil and gas being situated in a single volume. Here too, the piston has ducts, via which the part volumes on both sides of the piston are connected fluidically to one another, with the result that oil or gas can be exchanged between the part volumes depending on the position of the piston. Nitrogen, in particular, is used as gas. The active area which is loaded by the pressure for the load compensation is the cross section on the actuator rod, with which cross section said actuator rod passes through the housing head of the actuator housing. Depending on the static load which acts on the actuator, the pressure typically lies in the range between 2 and 21 bar. According to the disclosure, in a linear actuator with load compensation, no means such as a piston or a diaphragm or a balloon is thus provided, by way of which oil and gas would be separated from one another. Oil and gas adjoin one another directly. It is to be noted here that linear actuators of the designated type are typically used in movement systems and stand vertically here or are inclined only a little with respect to the vertical. The oil which is situated in the interior of the actuator housing is then collected in that region of the housing which is situated at the bottom. If the actuator rod protrudes upward out of the housing head of the actuator housing, the oil will collect above the housing bottom of the actuator housing. This use position of the linear actuator is preferred.

It is possible that oil and nitrogen mix and a foam is situated in the actuator housing. However, this does not influence the load compensation or the function of the linear actuator. In addition, mixing can be largely prevented by way of the selection of the oil, by an oil being used, for example, which has been developed specifically for the lubrication of transmissions or axles.

Advantageous refinements of a linear actuator according to the disclosure can be gathered from the subclaims.

The free volume within the linear actuator changes during the retraction and extension of the actuator rod. This is due to the fact that the actuator rod takes up less or more of the volume of the interior space of the actuator housing depending on the position. During the retraction and the extension of the actuator rod, the pressure therefore also changes in accordance with the gas laws according to an isothermal or adiabatic state change. Optimum compensation of the static load for every application can be obtained by way of the selection of the volume proportion which is filled by oil which can be compressed only a little, and the corresponding remaining volume proportion which is filled with gas. During the normal use, merely checking of the pressure and possibly a correction, usually an increase in the pressure, are then necessary. It has proven favorable if from 30 to 50% of the actuator housing is filled with gas and from 50 to 70% is filled with oil, if, in particular, approximately 40% of the actuator housing is filled with gas and approximately 60% of the actuator housing is filled with oil when the actuator rod is retracted completely.

The oil serves primarily to lubricate the parts of the linear actuator which move against one another. The pivot bearing of the threaded spindle and the threaded spindle/spindle nut combination are lubricated by the oil. The guidance of the spindle nut on the actuator housing, the guidance of the actuator rod and all dynamic seals are likewise lubricated.

There is preferably an open fluidic connection between the interior of the actuator housing and the cavity in the actuator rod while bypassing the threads of spindle and spindle nut. Although a certain fluid flow between the two threads is also possible, it is not sufficient to ensure such a fluid exchange between the cavity in the actuator rod and the interior of the actuator housing that in each case equal pressures prevail in the cavity and in the housing interior. The additionally open connection is therefore advantageously provided.

The open fluidic connection can be produced via at least one radial bore in the hollow actuator rod. The open fluidic connection is advantageously configured, however, via the piston and an open end of the actuator rod, which open end dips into the piston. The actuator rod then does not require any additional machining. Moreover, it is not weakened by bores.

The open fluidic connection is preferably configured in a siphon-like manner via the piston and the open end of the actuator rod.

Since, in a linear actuator according to the disclosure, the piston can surface from the oil and can be moved above the oil in the gas atmosphere, it is advantageous if the piston is configured in such a way that the threads on the spindle nut and spindle, when they are situated above the oil level, are lubricated from an oil supply which is carried along by the piston.

An oil supply of this type can be obtained in a simple way by virtue of the fact that the thread turns on the spindle nut of the piston are connected with a supply volume which is configured in the piston and is open toward the interior of the actuator housing at a spacing upstream of the thread turns.

The supply volume can be connected to the fluidic connection between the interior of the actuator housing and the cavity in the actuator rod.

The region of the guide between the piston and the actuator housing is advantageously also lubricated with oil from an oil supply if the piston is moved in gas atmosphere. This is achieved in a simple way by virtue of the fact that the piston is provided, on its outer side which is guided by the actuator housing, with a turned groove which is open on the end side.

BRIEF DESCRIPTION OF THE DRAWINGS

One exemplary embodiment of a linear actuator according to the disclosure is shown in the drawings. The disclosure will now be explained in greater detail using said drawings, in which:

FIG. 3 shows a longitudinal section through the linear actuator in the region of the housing head of the actuator housing on an enlarged scale.

DETAILED DESCRIPTION

Figure 1:
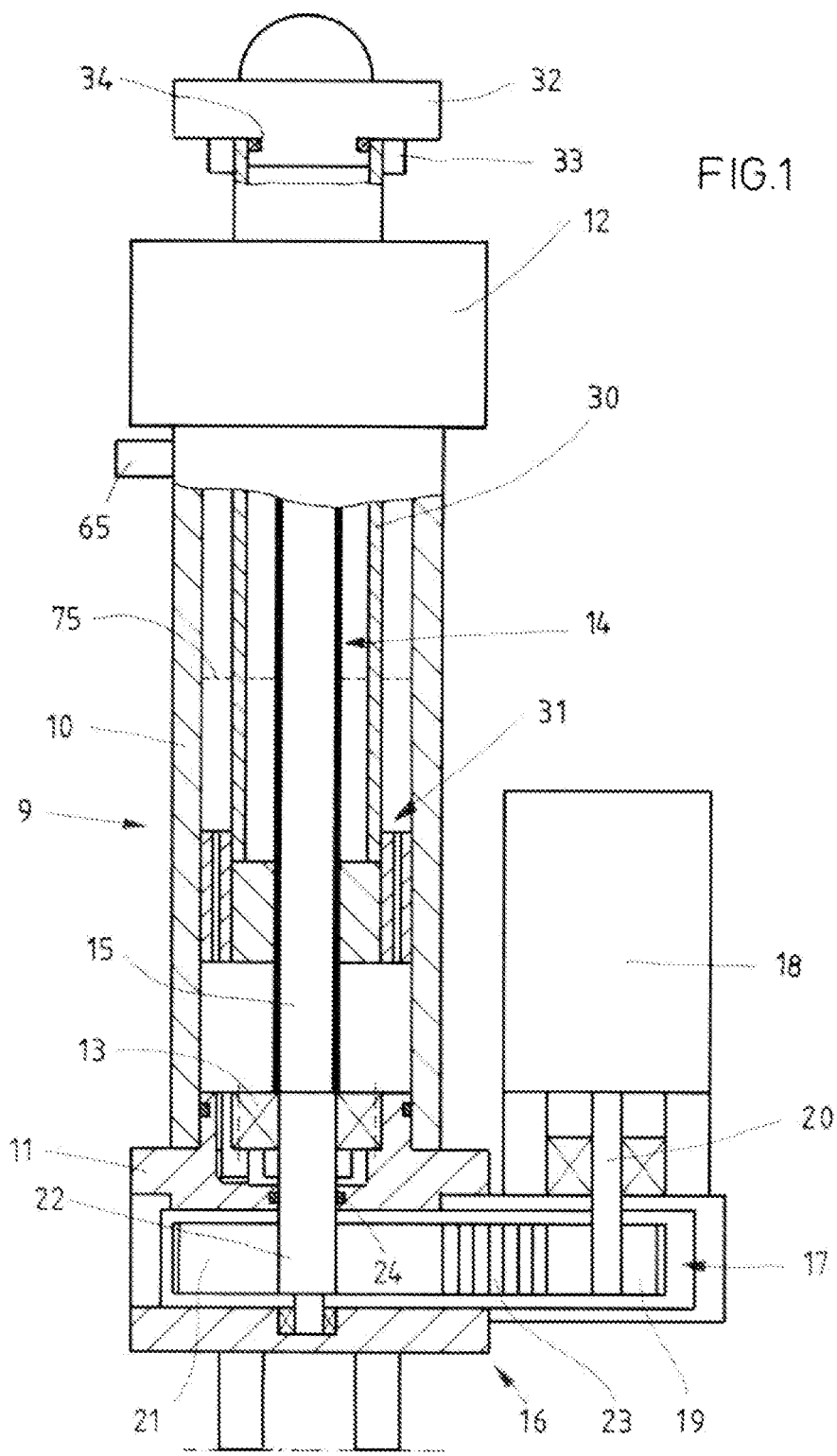
FIG. 1 shows the linear actuator partially in a longitudinal section, and in a greatly simplified illustration.

As can be seen from FIG. 1, the linear actuator has an actuator housing 9 with a tube 10, at the one end of which a housing bottom 11 is situated and at the other end of which a housing head 12 is situated. A threaded spindle 14 is mounted rotatably in the housing bottom via an anti-friction bearing 13, which threaded spindle 14 extends with a section 15 which is provided with a thread from the anti-friction bearing into the interior space of the actuator housing 9 in an axially non-displaceable manner. Together with further components, the housing bottom 11 at the same time forms a housing 16 for a toothed belt mechanism 17, via which the threaded spindle 14 can be driven rotationally by an electric motor 18 which is arranged in parallel next to the actuator housing 9. The belt mechanism 17 consists of a first toothed pulley wheel 19 which is seated fixedly so as to rotate with it on the shaft 20 of the electric motor 18 which protrudes into the housing 16, a second toothed pulley wheel 21 which is larger than the first pulley wheel 19 and is seated fixedly so as to rotate with it on a shaft journal 22 of the threaded spindle 14 which protrudes into the housing 16, and a toothed belt 23 which runs over the two pulley wheels 19 and 21. The passage of the shaft journal 22 is sealed by way of a shaft sealing ring 24.

Furthermore, the linear actuator has an actuator rod 30 which is configured as a tube, is fastened to a piston 31 in the interior of the actuator housing 9 and protrudes through the housing head 12 to the outside. That end of the hollow actuator rod which is situated outside the actuator housing 9 is closed by way of an adapter 32 which is centered with a collar in the actuator rod and is screwed to a flange 33 which is screwed onto the actuator rod. A sealing ring 34 is arranged between the collar of the adapter 32 and the actuator rod 30, by way of which sealing ring 34 the interior of the actuator rod 30 is sealed to the outside.

Figure 2:
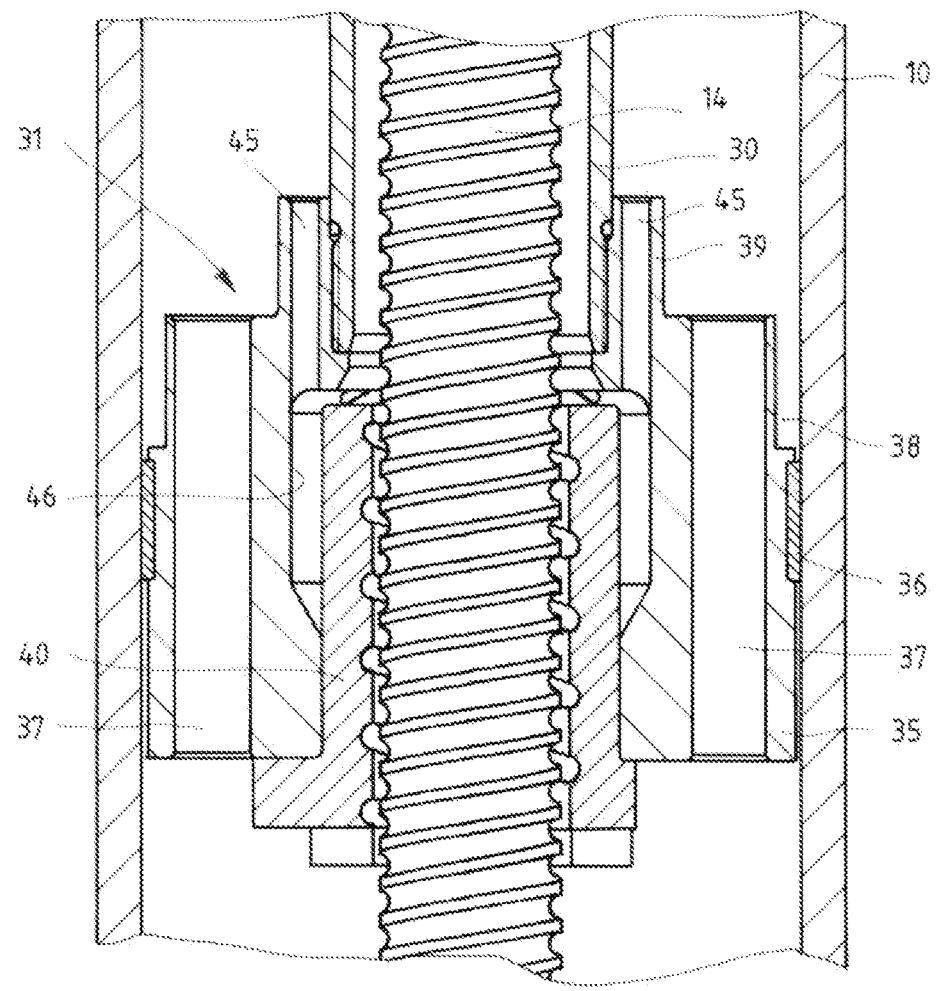
FIG. 2 shows a longitudinal section through the linear actuator in the region of the piston on an enlarged scale.

The construction of the piston 31 is apparent in greater detail from FIG. 2. According to said figure, the piston 31 has a sleeve-like guide part 35 with an outer circumferential groove, into which a guide band 36 is inserted, by way of which the piston 31 is guided longitudinally in the actuator housing 9. A plurality of bores 37 which run in the axial direction are situated in the guide part, through which bores 37 that part volume of the interior of the actuator housing 9 which is situated between the wall of the actuator housing and the actuator rod and the part volume on the other side of the piston 31 are open fluidically with respect to one another. From the end side which points in the same direction as the actuator rod 30, a turned groove 38 is made in the guide part 35 up to a small spacing from the groove which receives the guide band 36, with the result that there is an annular clearance between the actuator housing 9 and the piston 31.

In the center, the sleeve-like guide part 35 of the piston 31 has a projecting collar 39 which is provided with an internal thread and into which the actuator rod 30 which is provided with an external thread over a defined section from its piston-side end is screwed as far as an inwardly projecting shoulder of the guide part 35. The connection is advantageously secured by way of a threaded pin (not shown in greater detail) which is radially screwed into the collar 39.

From the side which faces away from the actuator rod 30, a spindle nut 40 which is configured as a flange bushing is inserted into the guide part 35 of the piston 31 and is connected fixedly to the guide part 35. With an internal thread, the spindle nut 40 interacts with the thread of the threaded spindle 14. During operation, the unit comprising actuator rod 30 and piston 31 including the spindle nut is secured against rotation by way of the fastening of the actuator rod on a load. A rotational movement of the threaded spindle 14 therefore leads to an axial movement of piston and actuator rod. The threaded spindle 14 extends through the spindle nut 40 into the actuator rod to a greater or lesser extent depending on the position of the actuator rod 30.

Distributed at an identical angular offset with respect to one another, a plurality of axial bores 45 are made in the collar 39 of the guide part 35, which axial bores 45 open on the inside into a hollowed-out portion 46 which surrounds the spindle nut over part of its longitudinal extent. The inner end side of the spindle nut is at a spacing from the one end of the hollowed-out portion 46, with the result that there is an open siphon-like fluidic connection between the interior space of the actuator rod 30 and the interior space of the actuator housing 9 via the axial bores 45 and the hollowed-out portion 46.

The housing head 12 of the actuator housing 9 comprises a disk 47 which is screwed onto the tubular part of the actuator housing 9 with a collar 48 which is provided with an internal thread. The disk 47 has a stepped through bore 49 with a section 50 of large diameter adjacently to the outer end side which faces away from the interior of the actuator housing 9 and with a section 51 of smaller diameter adjacently to the inner end side which faces the interior of the actuator housing 9. The diameter of the section 51 is larger than the external diameter of the actuator rod 30, however. From the inner end side, a guide bushing 52 which is configured as a flange bushing with a bushing flange 61 is inserted into the disk 47, the diameter of which in front of the bushing flange is slightly smaller than the diameter of the through bore 49 in the region of the section 51, and which guide bushing 52 reaches as far as that end side of the disk 47 which faces away from the interior of the actuator housing 9. On the inside, the guide bushing 52 is provided with annular grooves, into which two guide bands 53 and 54 which interact with the actuator rod, a sealing ring 55 which seals the gap between the guide bushing and the actuator rod in a gastight manner, and a stripper 56 are inserted. The outer diameter of the bushing flange 61 of the guide bushing 52 is slightly smaller than the inner diameter of the tube 10 of the actuator housing 9. The gap is sealed by way of a sealing ring 57. On account of the selected dimensions, there is an annular space 62 between the guide bushing 52 and the wall of the section 50 of the through bore 49, which annular space 62 is covered with a thin plate 60, in order that it does not become contaminated.

The bushing flange 61 of the guide bushing 52 is at a spacing from that end side of the disk 47 which faces the interior of the actuator housing 9, with the result that there is an annular clearance 58 between the disk 47 and the bushing flange 61. Said clearance 58 is ventilated to the outside via radial bores 59 in the disk 47. The inner diameter of the bushing flange 61 is somewhat larger than the outer diameter of the collar 39 on the piston 31, with the result that there is an annular space 63 between the bushing flange 61 and the actuator rod, into which annular space 63 the collar 39 can dip. The annular space 63 and the collar 39 on the piston therefore allow the provision of the necessary thread length for fastening the actuator rod, without the stroke of the actuator rod 30 being shortened by the bushing flange 61.

A plurality of (four in the present case, for example, for a defined payload) honeycomb-like annular segments 70 which are spaced apart from one another uniformly and are made from an aluminum material are inserted into the annular space 62, which annular segments 70 are held in their positions distributed over the circumference of the annular space 62 on their radial outer side by way of an adhesive on the disk 47. A plurality of (four in the present case, for example) honeycomb-like annular segments 71 which are spaced apart from one another uniformly and are made from an aluminum material are inserted into the annular space 58, which annular segments 71 are held in their positions distributed over the circumference of the annular space 58 on their radial outer side by way of an adhesive on the tube 10. The annular segments 70 and 71 serve as deformation elements for the conversion of kinetic energy into deformation energy if the actuator rod moves in an uncontrolled manner in an emergency or in the case of a malfunction of the linear actuator. The annular segments 70 and 71 are therefore the buffer elements which are denoted thus further above in the exemplary embodiment. The annular segments 71 are designed differently from the annular segments 70, and have, for example, a shorter maximum deformation path than the annular segments 70. In the case of a greater payload, more than four (for example, eight) annular segments can be situated in the annular spaces 58 and 62, with an area which is then twice as large as in the case of four annular segments.

Other cross-sectional shapes than the shape of an annular segment are also conceivable for the buffer elements, for example a circular-cylindrical shape or a parallelepiped shape.

If the actuator rod 30 retracts in an uncontrolled manner in the case of a malfunction, the flange 33 impacts on the guide bushing 52 and via the plate 60 on the deformation elements which are situated in the annular space 62, and is decelerated, the guide bushing 52 being pushed inward and the deformation elements being deformed. If the actuator rod 30 extends in an uncontrolled manner in the case of a malfunction, the piston 31 impacts on the bushing flange 61 of the guide bushing 52 and displaces the bushing flange and therefore the guide bushing counter to the force which is necessary for deforming the deformation elements which are situated in the annular space 58. Here, air which is situated in the annular space can escape through the bores 59.

The buffer force depends on what angular region of the annular spaces 58 and 62 is filled by deformation elements and how the deformation elements are configured. If an annular space is to be filled completely, this can be achieved by way of a single annular deformation element.

The entire interior space of the linear actuator is filled with dry nitrogen and oil, there being no dividing element which would separate the nitrogen and the oil from one another. In the case of a completely retracted actuator rod, approximately 60% of the interior space is filled with oil and approximately 40% is filled with nitrogen. In FIG. 1, the oil level in the case of a vertical operating position of the linear actuator is indicated by the dashed line 75. The nitrogen is filled via a valve 65 and is subjected to a pressure which is selected depending on the magnitude of the load. The relatively small volume of nitrogen means that the inner pressure in the actuator is discernibly higher in the case of a retracted actuator rod than in the case of an extended actuator rod. The acceleration and extension of the actuator rod counter to the weight of the payload are assisted by the high inner pressure in the actuator. During retraction of the actuator rod, the weight acts in the movement direction of the actuator rod. The lower inner pressure in the actuator inhibits the acceleration of the payload to a lesser extent.

The inner pressure also acts on the guide bushing 52 and secures it in an axial position, in which the bushing flange 61 bears against the deformation elements 71 which are situated in the annular space 58 and, via said deformation elements 71, against the disk 47. The guide bushing 52 can therefore run easily in the disk 47 and in the tube 10.

The linear actuator is preferably provided for applications, in which only limited angles with respect to the vertical are inclined, the actuator rod protruding upward out of the actuator housing, with the result that the oil is situated above the housing bottom 11. The gas is situated above the oil. During operation, the piston 31 can be dipped completely into the oil or can be situated completely or partially above the oil level. As a result of the siphon-like design of the connection between the interior space of the actuator housing 9 with the axial bores 45 and as a result of the turned groove 38 on the outside of the guide part 35 of the piston 31, two storage spaces for oil are provided, in which oil is provided even when the piston 31 is situated above the oil level. It is therefore ensured, even if the piston 31 moves in the gas, that the threads of the threaded spindle 14 and the spindle nut 40 and the guide band 36 are lubricated with oil.

LIST OF DESIGNATIONS

9 Actuator housing
10 Tube of 9

11 Housing bottom
12 Housing head
13 Anti-friction bearing
14 Threaded spindle
15 Section of 14
16 Housing
17 Toothed belt mechanism
18 Electric motor
19 Pulley wheel
20 Shaft of 18
21 Pulley wheel
22 Shaft journal of 14
23 Toothed belt
24 Shaft sealing ring
30 Actuator rod
31 Piston
32 Adapter
33 Flange
34 Sealing ring
35 Guide part of 31
36 Guide band
37 Bores
38 Turned groove
39 Collar of 35
40 Spindle nut
45 Axial bores in 35
46 Hollowed-out portion in 35
47 Disk of 12
48 Collar of 47
49 Through bore in 47
50 Section of 49
51 Section of 49
52 Guide bushing
53 Guide band
54 Guide band
55 Sealing ring
56 Stripper
57 Sealing ring
58 Annular space
59 Radial bores
60 Plate
61 Bushing flange on 52
62 Annular space
63 Annular space
65 Valve
70 Buffer elements
71 Buffer elements
75 Oil level

What is claimed is:

1. A linear actuator for moving a load comprising:
a tubular actuator housing including an end-side housing bottom and an end-side housing head, the actuator housing filled with pressurized oil and gas, the oil and gas being situated in a single volume;
a rotatably drivable threaded spindle mounted rotatably in the housing bottom and extending in an interior of the actuator housing from the housing bottom in a direction of the housing head;
a piston including a spindle nut in engagement with the threaded spindle and guided longitudinally in the actuator housing; and
a hollow actuator rod assembled with the piston, into which actuator rod the threaded spindle dips, and which actuator rod protrudes out of the actuator housing on the housing head.

2. The linear actuator according to claim 1, wherein:
from 30 to 50 percent of the actuator housing is filled with gas, and
from 50 to 70 percent of the actuator housing is filled with oil.

3. The linear actuator according to claim 2, wherein:
approximately 40 percent of the actuator housing is filled with gas when the actuator rod is retracted completely, and
approximately 60 percent of the actuator housing is filled with oil when the actuator rod is retracted completely.

4. The linear actuator according to claim 1, wherein an interior of the actuator housing is in open fluidic communication with a cavity in the actuator rod through an open fluidic communication path, wherein the open fluidic communication path does not extend through the spindle nut.

5. The linear actuator according to claim 4, wherein the open fluidic communication path extends from an open end of the actuator rod through the piston.

6. The linear actuator according to claim 5, wherein the open fluidic communication path extends downwardly and upwardly.

7. The linear actuator according to claim 1, wherein threads on the spindle nut and the threaded spindle, when they are situated above the oil level, are lubricated from an oil supply which is carried along by the piston.

8. The linear actuator according to claim 7, wherein an inner region of the spindle nut which is provided with thread turns is connected to a supply volume which is configured in the piston and is open towards the interior of the actuator housing at a spacing above the thread turns.

9. The linear actuator according to claim 8, wherein the supply volume is connected to an open fluidic communication path between the interior of the actuator housing and a cavity in the actuator rod.

10. The linear actuator according to claim 1, wherein the piston is provided, on its radial outer side which is guided by the actuator housing, with a turned groove which is open on an end side.

* * * * *